(12) United States Patent
Jung (10) Patent No.: US 12,176,155 B2
(45) Date of Patent: Dec. 24, 2024

(54) TANTALUM CAPACITOR HAVING LEAD FRAME INCLUDING PLURAL ELECTRODE PORTIONS INCLINED IN DIFFERENT DIRECTIONS

(71) Applicant: SAMSUNG ELECTRO-MECHANICS CO., LTD., Suwon-si (KR)

(72) Inventor: Hun Chol Jung, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 243 days.

(21) Appl. No.: 17/877,243

(22) Filed: Jul. 29, 2022

(65) Prior Publication Data

US 2023/0290579 A1 Sep. 14, 2023

(30) Foreign Application Priority Data

Mar. 11, 2022 (KR) .......................... 10-2022-0030510

(51) Int. Cl.
*H01G 9/012* (2006.01)
*H01G 9/042* (2006.01)
(Continued)

(52) U.S. Cl.
CPC ............. *H01G 9/012* (2013.01); *H01G 9/042* (2013.01); *H01G 9/048* (2013.01); *H01G 9/10* (2013.01); *H01G 9/15* (2013.01); *H01G 2009/05* (2013.01)

(58) Field of Classification Search
CPC ................................ H01G 9/15; H01G 9/012
See application file for complete search history.

(56) References Cited

U.S. PATENT DOCUMENTS 4,882,115 A * 11/1989 Schmickl ................. H01G 9/08
   29/25.03
5,469,326 A * 11/1995 Kanetake ............... H01G 9/012
   361/534

(Continued)

FOREIGN PATENT DOCUMENTS

JP        04348512 A  * 12/1992
JP     2009076737 A  *  4/2009
(Continued)

*Primary Examiner* — David M Sinclair
(74) *Attorney, Agent, or Firm* — Morgan, Lewis & Bockius LLP (57) ABSTRACT

A tantalum capacitor includes a tantalum body having one surface which a tantalum wire extends from, a molded portion including first and second surfaces facing each other in a first direction and third and fourth surfaces facing each other in a second direction, and surrounding the tantalum body, a first lead frame including a first electrode portion in contact with the second surface of the molded portion, a second electrode portion connected to the first electrode portion, a third electrode portion connected to the second electrode portion, and a fourth electrode portion connected to the third electrode portion and the tantalum wire, and a second lead frame disposed to be in contact with the second surface of the molded portion and spaced apart from the first lead frame. The second electrode portion and the third electrode portion are inclined in different directions with respect to the second surface.

19 Claims, 8 Drawing Sheets

(51) Int. Cl.
    *H01G 9/048*     (2006.01)
    *H01G 9/10*     (2006.01)
    *H01G 9/15*     (2006.01)
    *H01G 9/04*     (2006.01)

(56) References Cited

U.S. PATENT DOCUMENTS

| | | | |
|---|---|---|---|
| 2006/0285277 A1* | 12/2006 | Hirata | H01G 9/15 |
| | | | 361/528 |
| 2007/0171599 A1* | 7/2007 | Matsuoka | H01G 9/012 |
| | | | 361/540 |
| 2010/0061037 A1* | 3/2010 | Zednicek | H01G 9/15 |
| | | | 361/523 |
| 2014/0104757 A1* | 4/2014 | Candeias | H01G 9/012 |
| | | | 361/523 |
| 2016/0027589 A1 | 1/2016 | Shin et al. | |
| 2016/0133390 A1 | 5/2016 | Yang et al. | |
| 2019/0214199 A1* | 7/2019 | Ueda | H01G 9/15 |
| 2023/0010854 A1* | 1/2023 | Yamaguchi | H01G 9/012 |

FOREIGN PATENT DOCUMENTS

| | | | | |
|---|---|---|---|---|
| JP | 2009200369 A | * | 9/2009 | |
| JP | 2011146548 A | * | 7/2011 | |
| JP | 4975946 B2 | | 7/2012 | |
| JP | 6087703 B2 | | 3/2017 | |
| KR | 10-2016-0013746 A | | 2/2016 | |
| KR | 10-2016-0054811 A | | 5/2016 | |
| WO | WO-2021193327 A1 | * | 9/2021 | H01G 9/012 |
| WO | WO-2022191029 A1 | * | 9/2022 | |

\* cited by examiner

TANTALUM CAPACITOR HAVING LEAD FRAME INCLUDING PLURAL ELECTRODE PORTIONS INCLINED IN DIFFERENT DIRECTIONS

CROSS-REFERENCE TO RELATED APPLICATION(S)

This application claims benefit of priority to Korean Patent Application No. 10-2022-0030510 filed on Mar. 11, 2022 in the Korean Intellectual Property Office, the disclosure of which is incorporated herein by reference in its entirety.

TECHNICAL FIELD

The present disclosure relates to a tantalum capacitor.

BACKGROUND

Due to the slimming of set equipment, miniaturization has been undertaken in the parts industry due to such slimming, and due to the enlargement of displays such as smartphones and tablet PCs and the increase in battery capacity due to the application of high-specification application processors (AP), capacitors having high capacitance and being reduced in size have been required in related markets.

A tantalum (Ta) material is a metal widely used throughout industries, such as in the aerospace and military fields as well as in the areas of electrical, electronic, mechanical and chemical engineering due to the high melting point and excellent mechanical or physical characteristics, such as ductility and corrosion resistance, thereof. Such a tantalum material is widely used as an anode material for small capacitors due to the ability thereof to form a stable anodic oxide film, and usage thereof has rapidly increased yearly due to the rapid development of the IT industry, such as electronics and information communications, in recent years.

In the case of a tantalum capacitor, in order to connect a tantalum wire to an electrode of a substrate on which the tantalum capacitor is mounted, the tantalum wire and an anode lead frame should be connected to each other. In the case of an example in the related art, an anode lead frame includes a wire electrode portion separately welded to an anode terminal unit, thus being connected to a tantalum wire. However, as the tantalum capacitor is miniaturized, a defect rate according to a welding process increases and manufacturing costs increase.

In order to solve the problem, according to another example in the related art, the anode lead frame includes a bent portion which is integrally formed without a welding process, thereby reducing an occurrence of defects and reducing manufacturing costs. However, since the anode lead frame includes the bent portion, the anode lead frame is connected to the tantalum wire in an inclined form, and thus, the anode lead frame is deformed during a welding impact, causing a short defect. In addition, bonding force between the anode lead frame and a molded portion may be weak, so that an interfacial delamination phenomenon in which the anode lead frame and the molded portion are detached from each other occurs, and as a result, external moisture may permeate to deteriorate the reliability of the tantalum capacitor.

SUMMARY

Exemplary embodiments provide a tantalum capacitor having excellent reliability by preventing interfacial delamination between a lead frame and a molded portion.

Exemplary embodiments provide a tantalum capacitor having excellent reliability by preventing deformation due to welding impact.

According to an aspect of the present disclosure, a tantalum capacitor includes: a tantalum body having one surface which a tantalum wire extends from; a molded portion including first and second surfaces facing each other in a first direction and third and fourth surfaces facing each other in a second direction, and surrounding the tantalum body; a first lead frame including a first electrode portion in contact with the second surface of the molded portion, a second electrode portion connected to the first electrode portion, a third electrode portion connected to the second electrode portion, and a fourth electrode portion connected to the third electrode portion and the tantalum wire; and a second lead frame disposed to be in contact with the second surface of the molded portion and spaced apart from the first lead frame. The second electrode portion and the third electrode portion are inclined in different directions with respect to the second surface of the molded portion.

According to another aspect of the present disclosure, a tantalum capacitor includes: a tantalum body having one surface which a tantalum wire extends from; a molded portion including first and second surfaces facing each other in a first direction and third and fourth surfaces facing each other in a second direction, and surrounding the tantalum body; a first lead frame disposed to be in contact with the second surface of the molded portion and connected to the tantalum wire; and a second lead frame disposed to be in contact with the second surface of the molded portion and spaced apart from the first lead frame. The first lead frame includes a first bent portion bent to be inclined toward the first surface of the molded portion from the second surface of the molded portion, a second bent portion disposed to be closer to the third surface of the molded portion than the first bent portion and bent to be inclined toward the second surface of the molded portion; and a third bent portion disposed to be closer to the third surface of the molded portion than the second bent portion and bent toward the tantalum wire.

According to another aspect of the present disclosure, a tantalum capacitor includes: a tantalum body having one surface which a tantalum wire extends from; a molded portion including first and second surfaces facing each other in a first direction and third and fourth surfaces facing each other in a second direction, and surrounding the tantalum body; a first lead frame including a first electrode portion in contact with the second surface of the molded portion, a fourth electrode portion connected to the tantalum wire, and a plurality of electrode portions having a zigzag shape connected between the first electrode portion and the fourth electrode portion; and a second lead frame disposed to be in contact with the second surface of the molded portion and spaced apart from the first lead frame.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, exemplary embodiments of the present inventive concept will be described in detail with reference to the accompanying drawings. The inventive concept may, however, be exemplified in many different forms and should not be construed as being limited to the specific embodiments set forth herein. Rather, these embodiments are provided so that this disclosure will be thorough and complete, and will fully convey the scope of the inventive concept to those skilled in the art. In the drawings, the shapes and dimensions of elements may be exaggerated for clarity, and the same reference numerals will be used throughout to designate the same or like elements.

To clarify the present invention, portions, irrespective of description, are omitted and like numbers refer to like elements throughout the specification, and in the drawings, the thickness of layers, films, panels, regions, etc., are exaggerated for clarity. Also, in the drawings, like reference numerals refer to like elements although they are illustrated in different drawings. Throughout the specification, unless explicitly described to the contrary, the word "comprise" and variations such as "comprises" or "comprising", will be understood to imply the inclusion of stated elements but not the exclusion of any other elements In the drawings, a first direction may be defined as a thickness (T) direction, a second direction may be defined as a length (L) direction, and a third direction may be defined as a width (W) direction.

Figure 1:
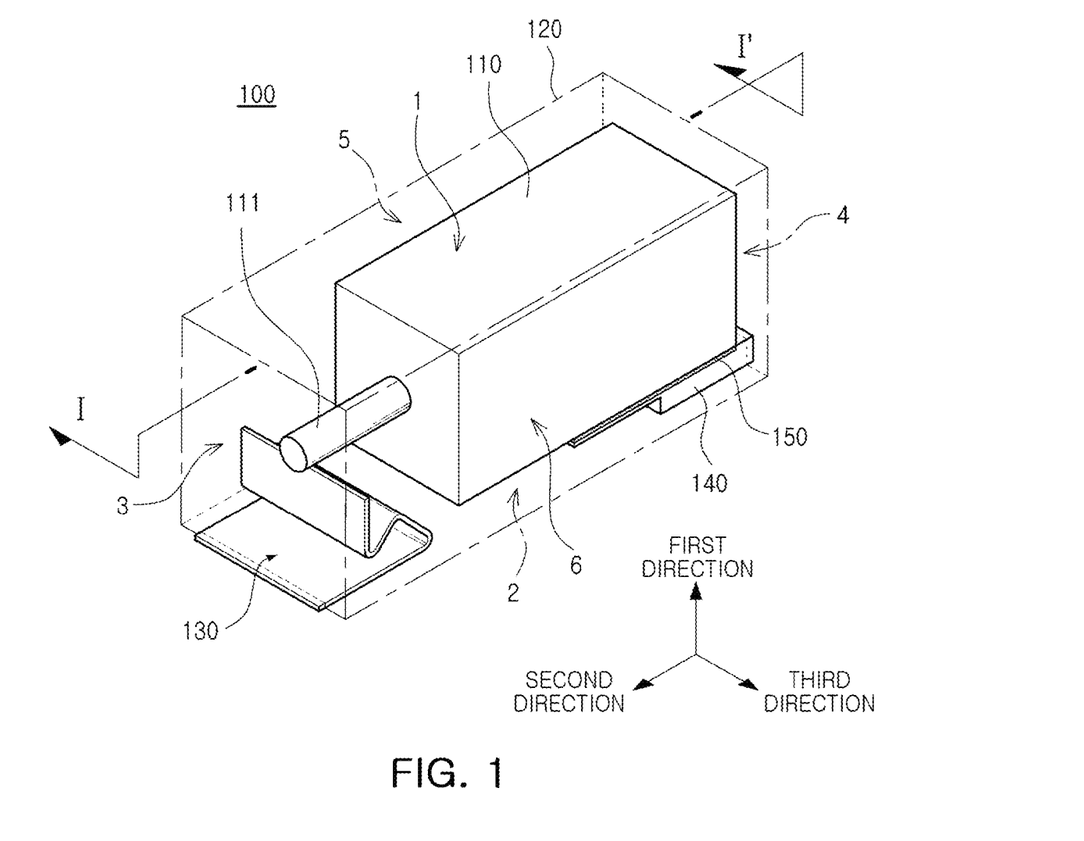
FIG. 1 is a perspective view schematically illustrating a tantalum capacitor according to an exemplary embodiment in the present disclosure.

FIG. 1 is a perspective view schematically illustrating a tantalum capacitor according to an exemplary embodiment in the present disclosure.

Figure 2:
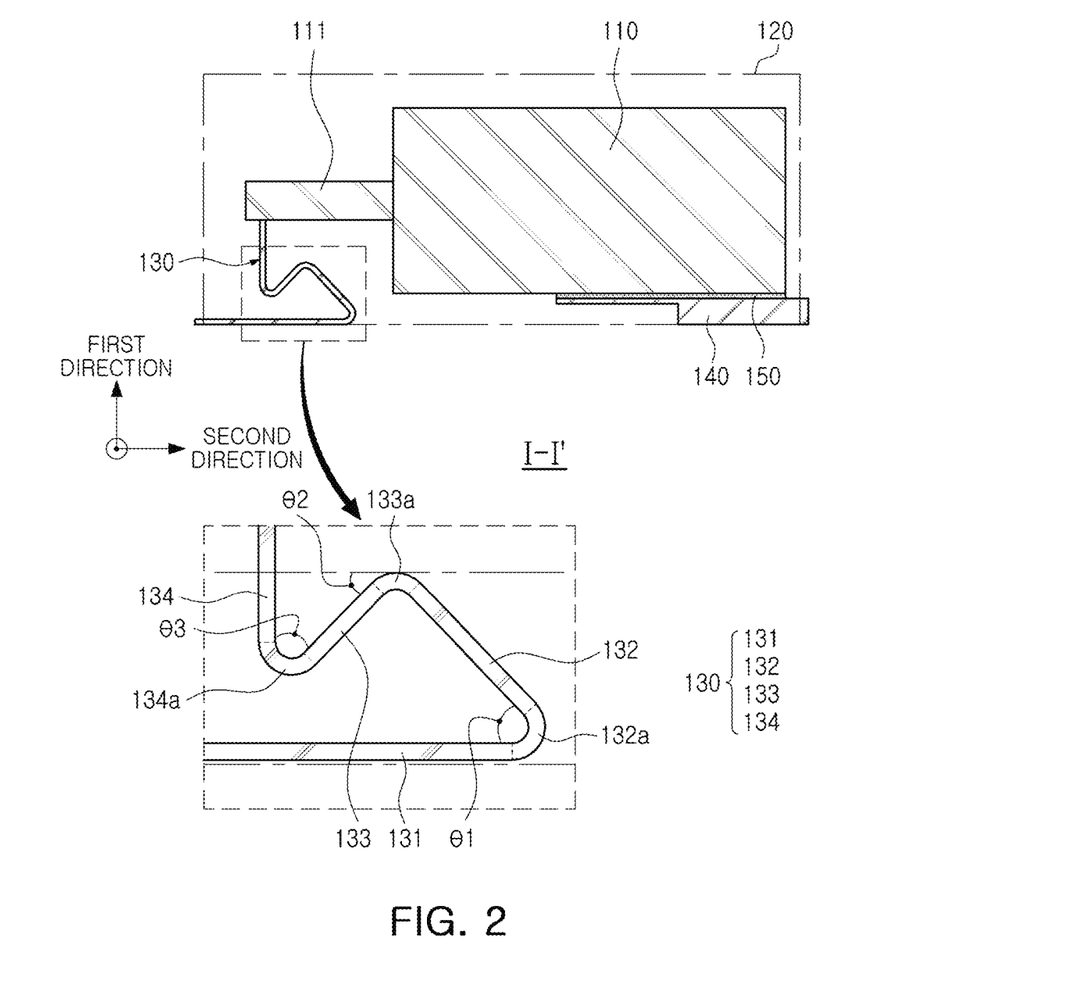
FIG. 2 is a cross-sectional view taken along line I-I' of FIG. 1.

FIG. 2 is a cross-sectional view taken along line I-I' of FIG. 1.

Referring to FIGS. 1 and 2, a tantalum capacitor 100 according to an exemplary embodiment in the present disclosure may include a tantalum body 110 in which a tantalum wire 111 is exposed to (or extend from) one surface, a molded portion 120 including first and second surfaces 1 and 2 facing each other in a first direction and third and fourth surfaces 3 and 4 facing each other in a second direction, and surrounding the tantalum body 110; a first lead frame 130 including a first electrode portion 131 in contact with the second surface 2 of the molded portion 120, a second electrode portion 132 connected to the first electrode portion 131, a third electrode portion 133 connected to the second electrode portion 132, and a fourth electrode portion 134 connected to the third electrode portion 133 and the tantalum wire 111; and a second lead frame 140 disposed to be in contact with the second surface 2 of the molded portion 120 and spaced apart from the first lead frame 130. The second electrode portion 132 and the third electrode portion 133 may be inclined in different directions with respect to the second surface 2 of the molded portion 120.

As described above, the tantalum capacitor of the related art has a problem in that a lead frame including a bent portion is connected to a tantalum wire in an inclined form, and thus the lead frame is deformed according to a welding impact, resulting in a short circuit defect.

Meanwhile, according to an exemplary embodiment in the present disclosure, since the first lead frame 130 includes the second and third electrode portions 132 and 133 inclined in different directions with respect to the second surface 2 of the molded portion 120, a contact area between the molded portion 120 and the first lead frame 130 can prevent interfacial delamination, thereby providing the tantalum capacitor 100 having excellent reliability. In addition, since the tantalum wire 111 and the first lead frame 130 are connected to each other substantially vertically, an occurrence of defects such as short circuits as a connection between the tantalum wire 111 and the first lead frame 130 is broken may be prevented.

Hereinafter, each component of the tantalum capacitor 100 according to an exemplary embodiment in the present disclosure will be described in more detail.

The tantalum body 110 may be formed using a tantalum material. For example, the tantalum body 110 may be manufactured by mixing tantalum (Ta) powder and a binder in a certain ratio, stirring the mixture, compressing the mixed powder to form a substantially rectangular parallelepiped, and then sintering the same under high temperature and high vibration.

In addition, the tantalum body 110 includes a tantalum wire 111 exposed from one surface thereof. The tantalum wire 111 may be exposed in the second direction, and may pass through at least a portion of the tantalum body 110 in the second direction. The tantalum wire 111 may be inserted into the mixture of the tantalum powder and the binder so as to be off-centered from the center to be mounted, before the mixture of the tantalum powder and the binder is compressed. That is, the tantalum body 110 may be formed by inserting the tantalum wire 111 into the tantalum powder mixed with the binder to form a tantalum element having a desired size, and then sintering the tantalum element under a high temperature, high vacuum ($10^{-5}$ torr or less) atmosphere for about 30 minutes.

The molded portion 120 may surround the tantalum body 110 and may include the first and second surfaces 1 and 2 facing each other in the first direction, the third and fourth surfaces 3 ad 4 connected to the first and second surfaces 1 and 2 and facing each other in the second direction, and fifth and sixth surfaces 5 and 6 connected to the first to fourth surfaces 1, 2, 3, and 4 and facing each other in the third direction. The molded portion 120 may be formed by transfer molding a resin such as epoxy molding compound (EMC) to surround the tantalum body 110. The molded portion 120 may serve to protect the tantalum body 110 and the tantalum wire 111 from the outside.

The first lead frame 130 may be formed of a conductive metal such as copper (Cu), nickel (Ni), or iron (Fe), and may be connected to an external power source to allow current to flow through the tantalum wire 111. For example, the first lead frame 130 may function as an anode of the tantalum capacitor 100. In this case, the first lead frame 130 may include the first electrode portion 131 in contact with the second surface 2 of the molded portion 120, the second electrode portion 132 connected to the first electrode portion 132, the third electrode portion 133 connected to the second electrode portion 132, and the fourth electrode portion 134 connected to the tantalum wire 111.

The second lead frame 140 may be formed of a conductive metal such as copper (Cu), nickel (Ni), or iron (Fe), may be in contact with the second surface 2 of the molded portion 120, and may be disposed to be spaced apart from the first lead frame 130. In this case, a portion of the second lead frame 140 may be exposed externally of the molded portion 120 to be used as a connection terminal for electrical connection with other electronic products. For example, the second lead frame 140 may function as a cathode of the tantalum capacitor 100.

In an exemplary embodiment, a conductive adhesive layer 150 may be disposed between the second lead frame 140 and the tantalum body 110. The conductive adhesive layer 150 may be formed by applying a predetermined amount of a conductive adhesive including, for example, an epoxy-based thermosetting resin and a conductive metal powder such as silver (Ag) and curing the conductive adhesive, but the present disclosure is not limited thereto. When the conductive adhesive layer 150 is disposed between the second lead frame 140 and the tantalum body 110, bonding strength of the second lead frame 140 with respect to the tantalum body 110 may be improved.

The first electrode portion 131 may be in contact with the second surface 2 of the molded portion 120, and may be exposed to (or extend on) the second surface 2 of the molded portion 120 to serve as a terminal when mounted on a board. In this case, the first electrode portion 131 may be disposed to be spaced apart from the tantalum body 110, and a space between the first electrode portion 131 and the tantalum body 110 may be filled with the molded portion 120 including a resin component such as EMC.

In an exemplary embodiment, at least a portion of the first electrode portion 131 may protrude from the third surface 3 of the molded portion 120. In this manner, when at least a portion of the first electrode portion 131 is disposed to protrude to the outside of the molded portion 120, a bonding area with solder may be increased when the tantalum capacitor 100 is mounted on a board, thereby improving adhesion to the board.

In the same view, at least a portion of the second lead frame 140 may protrude from the fourth surface 4 of the molded portion 120. Accordingly, when the tantalum capacitor 100 is mounted on a board, a bonding area with solder may be increased, thereby improving adhesion to the board.

The second electrode portion 132 may be connected to the first electrode portion 131, the third electrode portion 133 may be connected to the second electrode portion 132, and the second electrode portion 132 and the third electrode portion 133 may be inclined in different directions with respect to the second surface 2 of the molded portion 120. Here, the fact that the second electrode portion 132 and the third electrode portion 133 are inclined in different directions with respect to the second surface 2 of the molded portion 120 may mean that, for example, the second electrode portion 132 is inclined from the first electrode portion 131 toward the first surface 1 of the molded portion 120, and the third electrode portion 133 is inclined from the second electrode portion 132 toward the second surface 2 of the molded portion 120. In one example, the second electrode portion 132 and the third electrode portion 133 may provide a zigzag shape connected between the first electrode portion 131 and the fourth electrode portion 134.

At this time, the fact that the second electrode portion 132 is inclined from the first electrode portion 131 toward the first surface 1 of the molded portion 120 may mean that an inclination angle $\theta 1$ between the first electrode portion 131 and the second electrode portion 132 is greater than 0°, and that the third electrode portion 133 is inclined from the second electrode portion 132 toward the second surface 2 of the molded portion 120 may mean that the inclination angle $\theta 2$ between the third electrode portion 133 and the plane parallel to the second surface 2 of the molded portion 120 is greater than 0°. As will be described later, the inclination angle $\theta 1$ between the first electrode portion 131 and the second electrode portion 132 may be 90° or less to prevent contact between the tantalum body 110 and the first lead frame 130, and the inclination angle $\theta 2$ between the third electrode portion 133 and the plane parallel to the second surface 2 of the molded portion 120 may be less than 90° in consideration of a connection with the tantalum wire 111.

In an exemplary embodiment, the second electrode portion 132 may include a first bent portion 132a. The first bent portion 132a may connect the first electrode portion 131 to the second electrode portion 132, and may be bent to be inclined toward the first surface 1 of the molded portion 120. Also, the third electrode portion 133 may include a second bent portion 133a. The second bent portion 133a may connect the second electrode portion 132 to the third electrode portion 133, and may be bent to be inclined toward the second surface 2 of the molded portion 120.

The fourth electrode portion 134 is connected to the third electrode portion 133 and the tantalum wire 111. In this case, the fourth electrode portion 134 may be connected to the tantalum wire 111 by welding. The welding may be preferably performed using an electric spot welding method, but the present disclosure is not limited thereto. In an exemplary embodiment, the fourth electrode portion 134 may include a third bent portion 134a. The third bent portion 134a may connect the third electrode portion 133 to the fourth electrode portion 134, and may be bent toward the tantalum wire 111.

Since the first lead frame 130 includes the second electrode portion 132 and the third electrode portion 133 inclined in different directions with respect to the second surface 2 of the molded portion 120, a contact area between the molded portion 120 and the first lead frame 130 may be improved. Also, the volume of the molded portion 120 filling the space surrounded by the first to third electrode portions 131, 132, and 133 may increase. Accordingly, interfacial delamination between the molded portion 120 and the first lead frame 130 may be prevented. As a result, the mechanical strength of the tantalum capacitor 100 may be improved, external moisture penetration may be prevented, and a migration phenomenon in which the conductive metal included in the first lead frame 130 diffuses into the tantalum wire 111 may be prevented.

From the same viewpoint, the first lead frame 130 may include the first bent portion 132a that is bent to be inclined from the second surface 2 of the molded portion 120 toward the first surface 1 of the molded portion 120, the second bent portion 133a closer to the third surface 3 of the molded portion 120 than the first bent portion 132a and bent to be inclined toward the second surface 2 of the molded portion 120, and the third bent portion 134a closer to the third surface 3 of the molded portion 120 than the second bent portion 133a and bent toward the tantalum wire 111.

Here, since the first lead frame 130 includes the first bent portion 132a and the second bent portion 133a bent to be inclined in different directions, respectively toward the first surface 1 and the second surface 2 of the molded portion 120, a contact area between the molded portion 120 and the first lead frame 130 may be improved. Accordingly, interfacial delamination between the molded portion 120 and the first lead frame 130 may be prevented, and the mechanical strength of the tantalum capacitor 100 may be improved.

In an exemplary embodiment, the inclination angle θ1 formed by the first electrode portion 131 and the second electrode portion 132 may be 10 to 90°. Alternatively, the first lead frame 130 may form an acute angle or a right angle by the first bent portion 132a. If the inclination angle θ1 formed by the first electrode portion 131 and the second electrode portion 132 is less than 10°, the volume of the molded portion filling the space surrounded by the first to third electrode portions 131, 132, and 133 may be reduced and the effect of interfacial delamination and mechanical strength improvement may be insignificant. If the inclination angle θ1 between the first electrode portion 131 and the second electrode portion 132 is greater than 90°, the second electrode portion 132 may come into contact with the tantalum body 110 to cause a defect such as a short circuit. In addition, the inclination angle θ1 formed by the first electrode portion 131 and the second electrode portion 132 may be 85° or less, 80° or less, 75° or less, or 70° or less in consideration of preventing contact between the second electrode portion 132 and the tantalum body 110, but the present disclosure is not limited thereto. In addition, the inclination angle θ1 may be 15° or more, 20° or more, 25° or more, 30° or more, 35° or more, or 40° or more in consideration of the volume of the molded portion 120 filling the space surrounded by the first to third electrode portions 131, 132, and 133, but the present disclosure is not limited thereto.

In an exemplary embodiment, the fourth electrode portion 134 may be connected to the tantalum wire 111 substantially vertically. Here, the substantially vertical connection may mean that the angle formed between the fourth electrode portion 134 and the tantalum wire 111 is substantially vertical, and that an angle formed by the fourth electrode portion 134 and the tantalum wire 111 is within a range of 90°±5° in consideration of an error due to a welding process for connecting the fourth electrode portion 134 and the tantalum wire 111.

In this case, in order for the fourth electrode portion 134 to be vertically connected to the tantalum wire 111, the inclination angle θ3 between the third electrode portion 133 and the fourth electrode portion 134 may be an acute angle. In the same view, the first lead frame 130 may form an acute angle by the third bent portion 134a.

When the fourth electrode portion 134 is substantially vertically connected to the tantalum wire 111, the fourth electrode portion 134 may firmly support the tantalum wire 111. Accordingly, an occurrence of defects such as short-circuits or the like caused as the connection between the tantalum wire 111 and the first lead frame 130 is broken may be prevented. If the fourth electrode portion 134 and the tantalum wire 111 are not connected to each other substantially vertically, the fourth electrode portion 134 may be pressed in the first direction by a force applied in the first direction during a process of welding the fourth electrode portion 134 to the tantalum wire 111 to cause the first lead frame 130 to be deformed. In this case, the connection between the tantalum wire 111 and the first lead frame 130 may be broken and defects such as short circuit may occur.

In an exemplary embodiment, the fourth electrode portion 134 may be spaced apart from the first electrode portion 131. As the fourth electrode portion 134 is spaced apart from the first electrode portion 131, the molded portion 120 including a resin component such as EMC may be disposed between the fourth electrode portion 134 and the first electrode portion 131. Accordingly, the first lead frame 130 may be effectively protected by absorbing an impact occurring due to an external environment such as a welding process.

Figure 3:
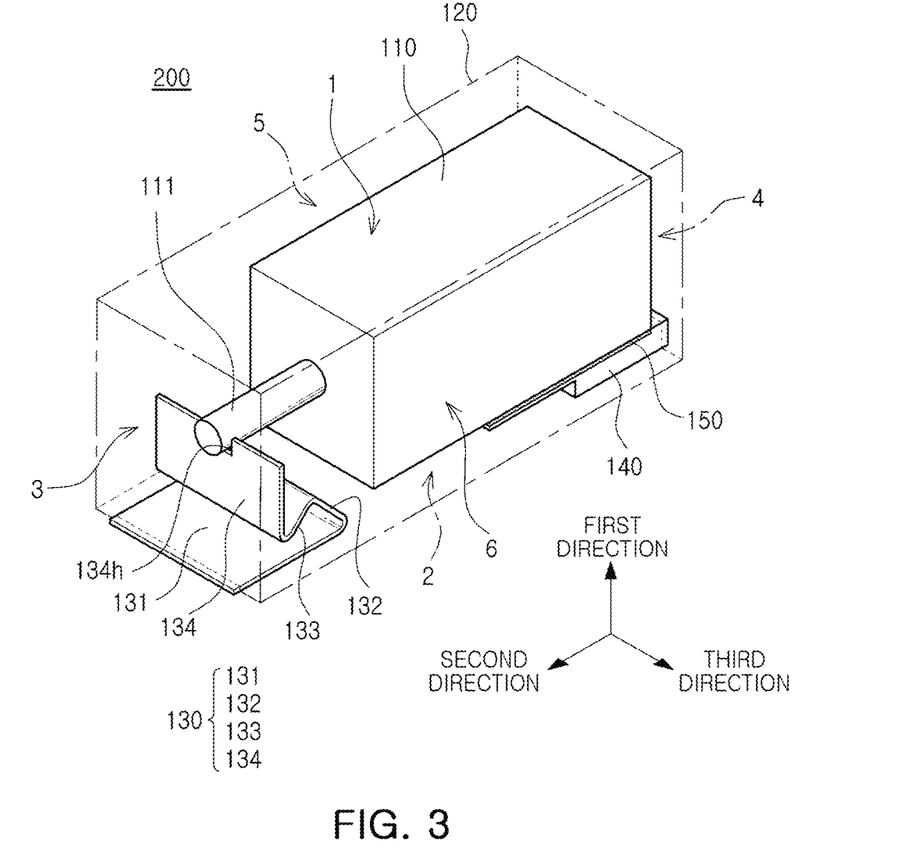
FIG. 3 is a perspective view schematically illustrating a tantalum capacitor according to an exemplary embodiment in the present disclosure.

FIG. 3 is a perspective view schematically illustrating a tantalum capacitor according to an exemplary embodiment in the present disclosure.

In an exemplary embodiment, a tantalum capacitor 200 may include a fourth electrode portion 134 having a recess 134h formed at one end thereof, and at least a portion of the tantalum wire 111 may be disposed in the recess 134h of the fourth electrode portion 134. That is, the tantalum wire 111 may be fitted into the recess 134h formed in the end portion of the fourth electrode portion 134. Since the tantalum capacitor 200 includes the recess 134h into which the tantalum wire 111 is fitted at the end portion of the fourth electrode portion 134, a contact area between the fourth electrode portion 134 and the tantalum wire 111 may be improved, and thus, welding stability and electrical connectivity may be improved. A method of forming the recess 134h is not particularly limited, and the recess 134h may be formed by punching or cutting a portion of the fourth electrode portion 134, for example.

Figure 4:
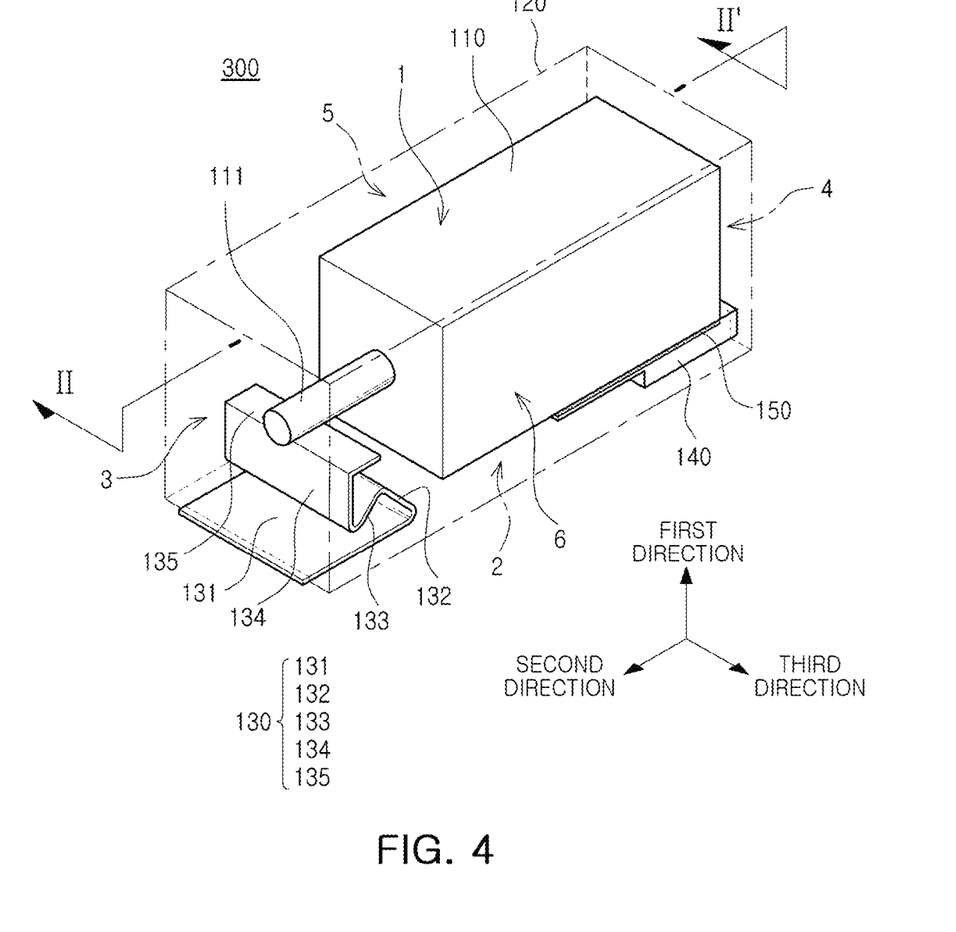
FIG. 4 is a perspective view schematically illustrating a tantalum capacitor according to another exemplary embodiment in the present disclosure.
Figure 5:
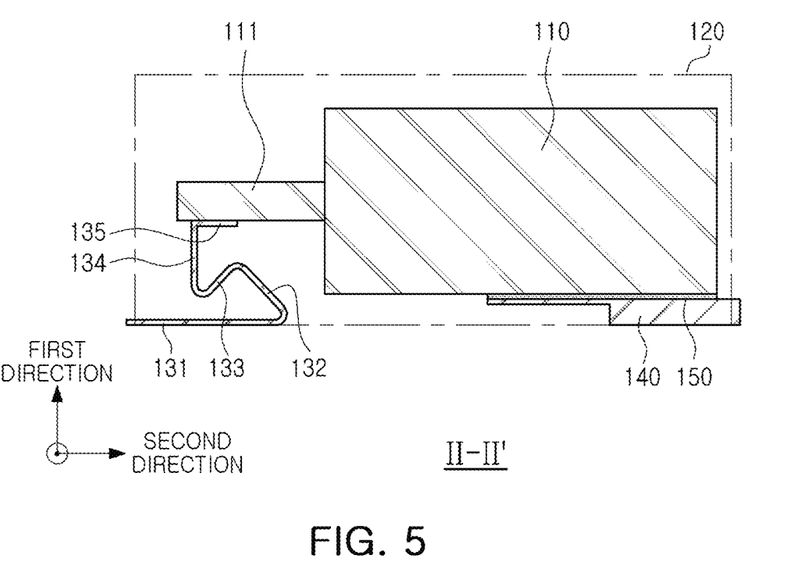
FIG. 5 is a cross-sectional view taken along line II-II' of FIG. 4.

FIG. 4 is a perspective view schematically illustrating a tantalum capacitor according to another exemplary embodiment in the present disclosure. FIG. 5 is a cross-sectional view taken along line II-II' of FIG. 4.

In an exemplary embodiment, the first lead frame 130 of a tantalum capacitor 300 may include a support portion 135 formed at an end of the fourth electrode portion 134, and the support portion 135 may be in contact with and connected to a lower surface of the tantalum wire 111. In this case, the support portion 135 may be vertically bent from the end of the fourth electrode portion 134. Since the tantalum capacitor 300 includes the support portion 135, the first lead frame 130 may be connected to the tantalum wire through the support portion 135, even though a length of the tantalum wire 111 in the second direction is reduced, and therefore, the volume and capacity of the tantalum body 110 may be further secured by increasing the length of the tantalum body 110 in the second direction.

In addition, mechanical stress of the first lead frame 130 in the first direction in which the first lead frame 130 receives force from the tantalum wire 111 during welding may be improved. More specifically, the support portion 135 is in contact with and connected to the lower surface of the tantalum wire 111 and supports the tantalum wire 111, mechanical stress in the first direction in which the second electrode portion 132 and the third electrode portion 133 are forced during the welding process may be improved, thereby providing the tantalum capacitor 300 having excellent reliability.

The support portion 135 may be formed by, for example, bending a portion of the fourth electrode portion 134 toward the tantalum body 110, but the present disclosure is not limited thereto. Here, the fourth electrode portion 134 may be connected to the tantalum wire 111 and the support portion 135 may be formed to be in contact with and connected to the lower surface of the tantalum wire 111 by using the first lead frame 130 (corresponding to the first lead frame 230 described with reference to FIGS. 6A-6F) before bending having a longer length in the second direction than that of an exemplary embodiment in which the support portion is not included in the process of bending the first lead frame 130 before bending.

Hereinafter, a method for manufacturing a tantalum capacitor according to an exemplary embodiment in the present disclosure will be described in detail, but the present disclosure is not limited thereto, and descriptions overlapping with the aforementioned tantalum capacitor among the descriptions of the method for manufacturing a tantalum capacitor will be omitted.

FIGS. 6A to 6F are cross-sectional views schematically illustrating a method for manufacturing a tantalum capacitor according to an exemplary embodiment in the present disclosure.

Referring to FIGS. 6A to 6F, in the method for manufacturing a tantalum capacitor, first, a first lead frame 230 and a second lead frame 240 before bending are prepared. As described above, the first lead frame 230 and the second lead frame 240 before bending may be formed using a conductive metal such as copper (Cu), nickel (Ni), or iron (Fe).

Figure 6A:
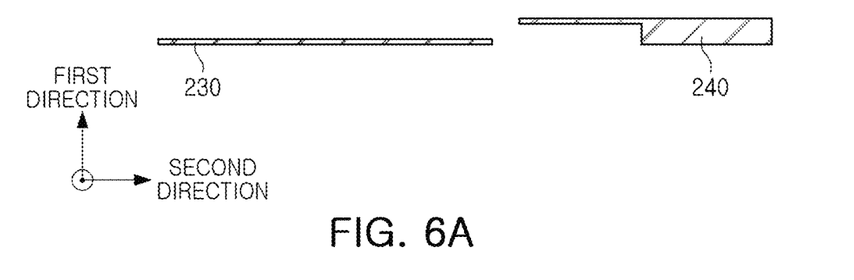
FIGS. 6A to 6F are cross-sectional views schematically illustrating a method for manufacturing a tantalum capacitor according to an exemplary embodiment in the present disclosure.
Figure 6B:
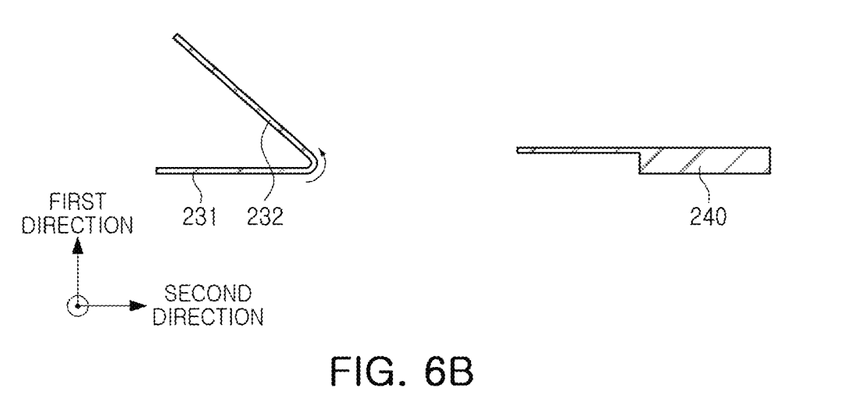

Next, as shown in FIG. 6B, the first lead frame 230 before bending is bent to form a first electrode portion 231 and a second electrode portion 232. In this case, a length of the first electrode portion 231 in the second direction may be appropriately selected in consideration of a length of the tantalum capacitor in the second direction.

Figure 6C:
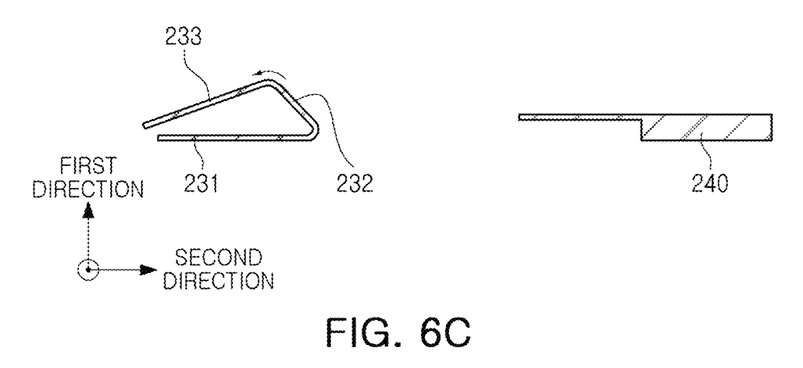
Figure 6D:
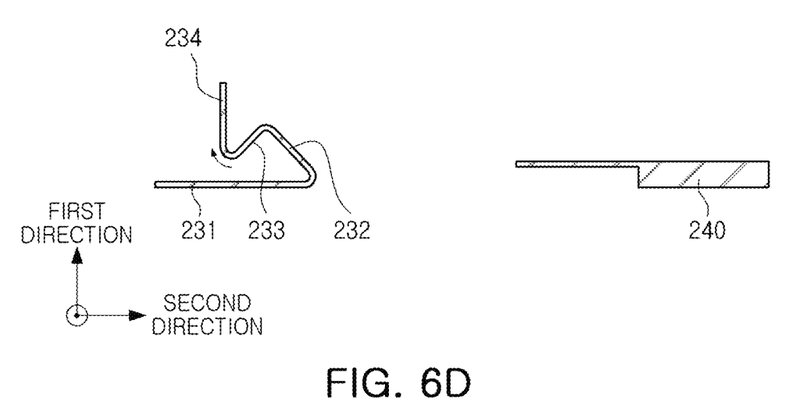

Next, as shown in FIGS. 6C and 6D, the second electrode portion 232 may be bent to form the third electrode portion 233, and the third electrode portion 233 may be bent to form the fourth electrode portion 234. The first to fourth electrode portions 231, 232, 233, and 234 may be integrally formed by bending the first lead frame 230 before bending, thereby simplifying the process and reducing manufacturing costs.

Figure 6E:
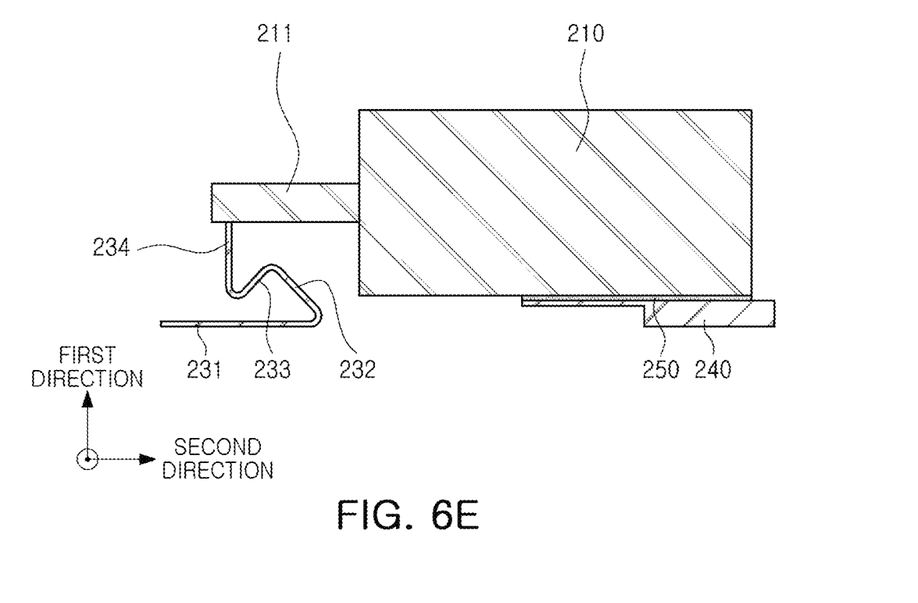

Next, referring to FIG. 6E, the tantalum body 210 in which the tantalum wire 211 is exposed from one surface thereof may be mounted on the first lead frame and the second lead frame. Here, in a state in which the tantalum wire 211 is brought into contact with the fourth electrode portion 234, the tantalum wire 211 and the fourth electrode portion 234 may be connected to each other through spot welding or laser welding.

In addition, before the tantalum body 210 is mounted, a conductive adhesive layer 250 having a predetermined thickness may be formed by applying a conductive adhesive to the second lead frame 240, thereby improving adhesion strength between the tantalum body 210 and the second lead frame 240.

Figure 6F:
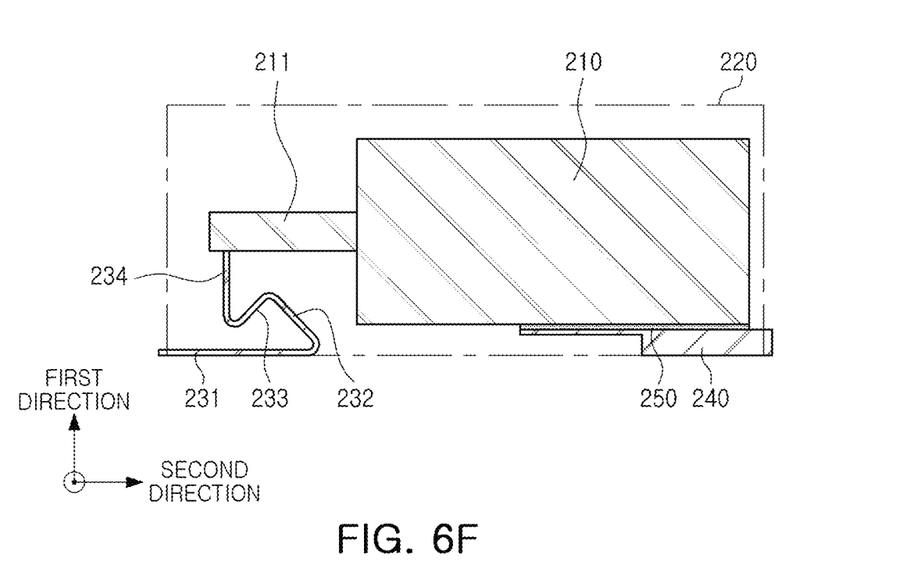

Next, referring to FIG. 6F, the molded portion 220 may be formed to surround the tantalum body 210 such that at least a portion of the first electrode portion 231 and the second lead frame 240 protrudes. In this case, the molded portion 220 may be formed by transfer molding a resin such as epoxy molding compound (EMC) to surround the tantalum body 210.

However, the present disclosure is not limited thereto, and the first lead frame 130 may be formed by connecting the second electrode portion to the first electrode portion by welding, connecting the third electrode portion to the second electrode portion by welding, and connecting the fourth electrode portion to the third electrode portion and the tantalum wire by welding.

As one of the various effects of the present invention, a tantalum capacitor having excellent reliability by preventing interfacial delamination between a lead frame and a molded portion may be provided.

As one of the various effects of the present invention, a tantalum capacitor having excellent reliability by preventing deformation due to welding impact may be provided.

While example exemplary embodiments have been shown and described above, it will be apparent to those skilled in the art that modifications and variations could be made without departing from the scope of the present disclosure as defined by the appended claims.

What is claimed is:

1. A tantalum capacitor comprising:
a tantalum body having one surface which a tantalum wire extends from;
a molded portion including first and second surfaces facing each other in a first direction and third and fourth surfaces facing each other in a second direction, and surrounding the tantalum body;
a first lead frame including a first electrode portion in contact with the second surface of the molded portion, a second electrode portion connected to the first electrode portion, a third electrode portion connected to the second electrode portion, and a fourth electrode portion connected to the third electrode portion and the tantalum wire; and
a second lead frame disposed to be in contact with the second surface of the molded portion and spaced apart from the first lead frame,
wherein the second electrode portion and the third electrode portion are inclined in different directions with respect to the second surface of the molded portion,
wherein the second electrode portion is inclined toward the first surface of the molded portion from the first electrode portion,
wherein the third electrode portion is inclined toward the second surface of the molded portion from the second electrode portion, and
wherein the fourth electrode portion is inclined toward the first surface of the molded portion from the third electrode portion so as to be connected to a lower surface of the tantalum wire.

2. The tantalum capacitor of claim 1, wherein the fourth electrode portion is substantially vertically connected to the tantalum wire.

3. The tantalum capacitor of claim 1, wherein at least a portion of the first electrode portion protrudes from the third surface of the molded portion, and at least a portion of the second lead frame protrudes from the fourth surface of the molded portion.

4. The tantalum capacitor of claim 1, wherein the fourth electrode portion is spaced apart from the first electrode portion.

5. The tantalum capacitor of claim 1, wherein an inclination angle between the first electrode portion and the second electrode portion is 10° to 90°.

6. The tantalum capacitor of claim 1, wherein one end portion of the fourth electrode portion includes a recess, and at least a portion of the tantalum wire is disposed in the recess of the fourth electrode portion.

7. The tantalum capacitor of claim 1, wherein
the first lead frame includes a support portion disposed at an end of the fourth electrode portion, and
the support portion is in contact with and connected to a lower surface of the tantalum wire.

8. The tantalum capacitor of claim 7, wherein the support portion is vertically bent from the end of the fourth electrode portion.

9. A tantalum capacitor comprising:
a tantalum body having one surface which a tantalum wire extends from;
a molded portion including first and second surfaces facing each other in a first direction and third and fourth surfaces facing each other in a second direction, and surrounding the tantalum body;
a first lead frame disposed to be in contact with the second surface of the molded portion and connected to the tantalum wire; and a second lead frame disposed to be in contact with the second surface of the molded portion and spaced apart from the first lead frame, wherein the first lead frame includes a first bent portion bent to be inclined toward the first surface of the molded portion from the second surface of the molded portion, a second bent portion disposed to be closer to the third surface of the molded portion than the first bent portion and bent to be inclined toward the second surface of the molded portion, and a third bent portion disposed to be closer to the third surface of the molded portion than the second bent portion and bent toward the tantalum wire so as to be connected to a lower surface of the tantalum wire.

10. The tantalum capacitor of claim 9, wherein the first lead frame is substantially vertically connected to the tantalum wire.

11. The tantalum capacitor of claim 9, wherein the first bent portion of the first lead frame has an acute or right angle.

12. The tantalum capacitor of claim 9, wherein the third bent portion of the first lead frame has an acute angle.

13. A tantalum capacitor comprising:
a tantalum body having one surface which a tantalum wire extends from in an extending direction;
a molded portion including first and second surfaces facing each other in a first direction and third and fourth surfaces facing each other in a second direction, and surrounding the tantalum body;
a first lead frame including a first electrode portion in contact with the second surface of the molded portion, a fourth electrode portion connected to the tantalum wire, and a plurality of electrode portions having a zigzag shape connected between the first electrode portion and the fourth electrode portion; and
a second lead frame disposed to be in contact with the second surface of the molded portion and spaced apart from the first lead frame,
wherein the first electrode portion extends from one end of the first electrode portion connected to the plurality of electrode portions to another end of the first electrode portion in the extending direction.

14. The tantalum capacitor of claim 13, wherein the fourth electrode portion is substantially vertically connected to the tantalum wire.

15. The tantalum capacitor of claim 13, wherein at least a portion of the first electrode portion protrudes from the third surface of the molded portion, and at least a portion of the second lead frame protrudes from the fourth surface of the molded portion.

16. The tantalum capacitor of claim 13, wherein the fourth electrode portion is spaced apart from the first electrode portion.

17. The tantalum capacitor of claim 13, wherein one end portion of the fourth electrode portion includes a recess, and at least a portion of the tantalum wire is disposed in the recess of the fourth electrode portion.

18. The tantalum capacitor of claim 13, wherein the first lead frame includes a support portion disposed at an end of the fourth electrode portion, and
the support portion is connected to a lower surface of the tantalum wire.

19. The tantalum capacitor of claim 18, wherein the support portion is bent from the fourth electrode portion.

* * * * *